United States Patent [19]

Von Buelow et al.

[11] Patent Number: 5,206,875
[45] Date of Patent: Apr. 27, 1993

[54] GASDYNAMIC CO LASER

[75] Inventors: Hartwig Von Buelow, Tuebingen; Eberhard Zeyfang, Reichenbach, both of Fed. Rep. of Germany

[73] Assignee: Deutsche Forschungsanstalt fuer Luft- und Raumfahrt e.V., Bonn, Fed. Rep. of Germany

[21] Appl. No.: 751,812

[22] Filed: Aug. 30, 1991

[30] Foreign Application Priority Data

Sep. 5, 1990 [DE] Fed. Rep. of Germany ....... 4028054

[51] Int. Cl.$^5$ .............................................. H01S 3/09
[52] U.S. Cl. ...................... 372/90; 372/55; 372/58; 372/82; 372/83; 372/94
[58] Field of Search ................. 372/90, 55, 87, 94, 372/81, 82, 83, 58

[56] References Cited

U.S. PATENT DOCUMENTS

Re. 29,103 1/1977 Wilson et al. .................... 372/90
4,194,169 3/1980 Rich et al. ....................... 372/90

OTHER PUBLICATIONS

Krause and Maisenhalder, "Gasdynamic CO Laser with Closed-Cycle Gas Flow," *Applied Physics* 22, pp. 421-427, 1980.
Brunet and Mabru, "Improved Performance of an Electric-Discharge $N_2$-CO Mixing Laser," *Journal of Applied Physics*, vol. 46, No. 7, pp. 3683-3684, Jul. 1975.
Brunet and Mabru, "Electrical CO-Mixing Gas-Dynamic Laser," *Applied Physics Letters*, vol. 21, No. 9, pp. 432-433, Nov. 1972.
Vallach, et al., "Transverse Excitation Pulsed Laser in Gas-Dynamically Cooled Mixtures," *Applied Physics Letters*, vol. 20, No. 10, pp. 395-397, May 15, 1972.
Hugel, "High-Power Gas Lasers," *Laser and Optoelectronic*, No. 1, pp. 21-27, 1985.
Schall, et al., "CW Carbon Monoxide Laser with Microwave Excitation in the Supersonic Flow," *Journal de Physique*, Colloque C9, Supplement au No. 11, Tome 41, pp. C9-217-223, Nov. 1980.

*Primary Examiner*—James W. Davie
*Attorney, Agent, or Firm*—Barry R. Lipsitz

[57] ABSTRACT

In order to improve a gasdynamic CO laser, comprising an excitation region, in which a laser gas is excited, a supersonic nozzle, through which the laser gas flows, a laser-active region penetrated by a resonator beam path and a closed laser gas circuit, in which the laser gas is cyclically conducted, such that this requires smaller pumping capacities and is therefore suitable for commercial uses, it is suggested that the supersonic nozzle be designed such that at a downstream outlet thereof the laser gas has a temperature in the region of approximately 80 to approximately 180 Kelvin.

23 Claims, 2 Drawing Sheets

GASDYNAMIC CO LASER

BACKGROUND OF THE INVENTION

The invention relates to a gasdynamic CO laser, comprising an excitation region, in which a laser gas is excited, a supersonic nozzle, through which the laser gas flows, a laser-active region penetrated by a resonator beam path and a closed laser gas circuit, in which the laser gas is cyclically conducted.

A gasdynamic CO laser of this type is known from Applied Physics, 22, pages 421–427 (1980).

In this gasdynamic CO laser the supersonic nozzle is designed such that after flowing therethrough the laser gas is present in the laser-active region at a pressure of, for example, 3 mbar.

This means, as also explained in the above-mentioned article, that adequate pumping capacities have to be made available in order to condense the laser gas which is cyclically conducted in the laser gas circuit from very low pressures, for example a final pressure in the diffuser of 10 mbar, to a pressure of 500 mbar and supply this gas to the excitation region again.

Such a high condensation of the laser gas requires large pumping capacities and, therefore, a constructional volume of the pumping system which negatively influences any commercial use of the gasdynamic CO laser to a considerable extent.

The object underlying the invention is therefore to improve a gasdynamic CO laser of the generic type such that this requires smaller pumping capacities and is therefore suitable for commercial uses.

SUMMARY OF THE INVENTION

This object is accomplished in accordance with the invention, for a gasdynamic CO laser of the type described at the outset, in that the supersonic nozzle is designed such that at a downstream outlet the laser gas has a temperature in the range of approximately 80 to approximately 180 Kelvin.

Such a design of the supersonic nozzle does not require any large expansion but creates the possibility of merely expanding to pressures in the region of approximately 10 to approximately 40 mbar and, therefore, of considerably reducing the pumping capacities due to the greater final pressure after the supersonic nozzle or a diffuser connected to the outlet thereof.

Moreover, a nozzle of this type has the additional advantage that it can be designed to be very short and, therefore, wall boundary layers, which have a considerably higher temperature, continue in the laser-active region and in this region contribute to a considerable reduction in the effectiveness of the laser activity and the beam quality, are formed in this nozzle only to an insignificant extent. Due to this short supersonic nozzle the wall boundary layers can be disregarded so that at the outlet of the supersonic nozzle the laser gas reaches the desired temperature almost in the entire flow cross section and, therefore, in the following laser-active region a laser activity having a high degree of effectiveness and a good beam quality is achieved.

In this respect, it is particularly advantageous for the supersonic nozzle to have a nozzle throat with a flow cross section forming an elongated rectangle or a slit and comprising a long and a short cross-sectional side. With this shape of the nozzle throat it is possible to have supersonic nozzles of a very short construction and thus suppress the wall boundary layers in an optimum manner.

In a particularly expedient construction of the supersonic nozzle, the supersonic nozzle widens downstream of the nozzle throat essentially only in the direction parallel to the short cross-sectional side. It is, in this respect, particularly favourable for the supersonic nozzle to have a constant dimension in the direction parallel to its long cross-sectional side.

In an additional expedient construction of the supersonic nozzle, this has, measured downstream of the nozzle throat, a length which is approximately four to eight times the dimension of the short cross-sectional side of the nozzle throat. It is even more advantageous for the supersonic nozzle to have a length which is approximately six times the dimension of the short cross-sectional side of the nozzle throat.

Within the framework of the invention, in a favourable construction of the supersonic nozzle this has at its downstream outlet a flow cross section with a short cross-sectional side, the dimension of which is approximately two to four times the dimension of the short cross-sectional side of the nozzle throat. In this respect, it is particularly favourable for the dimension of the short cross-sectional side at the outlet to be approximately three times the short cross-sectional side of the nozzle throat.

In a further development of the inventive solution, a diffuser is arranged in the circuit of the laser gas following the laser-active region and this diffuser causes an increase in pressure in the laser gas and therefore enables the pumping capacity to the reduced.

The diffuser is designed such that it causes an increase in pressure of the laser gas, the diffuser preferably being designed such that it causes an increase in pressure of the laser gas by a factor of 4 to 7.

The laser-active region could, as known, for example, from the state of the art, be arranged in the supersonic nozzle itself. It is, however, especially favourable for the laser-active region to be arranged downstream of the supersonic nozzle. This arrangement can be selected without problem in the inventive construction of the gasdynamic CO laser since none of the problems arising from the formation of wall boundary layers occur due to the short supersonic nozzle and so following the nozzle a flow with a laser gas which has the desired temperature almost over the entire flow cross section is present and can be introduced into the laser-active region.

In a particularly simple and expedient design from a constructional point of view, the laser-active region is formed by a passageway having an approximately constant flow cross section so that the laser gas flowing through the laser-active region has the same pressure and the same temperature throughout the entire region and this is a great advantage for the laser activity as well as the beam quality.

Since the laser-active region is limited by a passageway, the resonator can be advantageously constructed such that the passageway is penetrated several times by the resonator beam path in the form of branches arranged one behind the other in flow direction.

It is particularly advantageous with respect to the flow ratios when the passageway has a flow cross section corresponding to the flow cross section of the supersonic nozzle at its downstream outlet.

The excitation region could, in principle, be arranged both in the supersonic nozzle as well as after the supersonic nozzle. Within the framework of the inventive solution it has, however, proven to be particularly advantageous for the excitation region to be located upstream of the supersonic nozzle.

In an especially preferred embodiment, the laser gas is excited in the excitation region by means of a high-frequency discharge in a high-frequency discharge region and the high-frequency discharge region ends in front of the supersonic nozzle.

The provision of a high-frequency discharge offers the possibility of exciting the laser gas in a very stable and advantageous manner and also the possibility of adapting the high-frequency discharge region to the supersonic nozzle in an advantageous way so that this can be designed in accordance with the features described above.

In this respect, it is particularly advantageous for the high-frequency discharge region to extend in the direction parallel to the long cross-sectional side of the nozzle throat with essentially the dimensions thereof. This adaptation to the supersonic nozzle offers the big advantage that the supersonic nozzle can be operated in an optimal manner and, therefore, a short nozzle can be used in accordance with the conditions described at the outset.

In the most expedient adaptation, the high-frequency excitation region has at its outlet side a flow cross section which corresponds to that of an upstream inlet to the supersonic nozzle.

The high-frequency excitation region is advantageously designed such that it has a constant flow cross section in the direction of flow. The alignment of the high-frequency excitation region relative to the supersonic nozzle is then optimal when the high-frequency excitation region is arranged with a central axis in alignment with a central axis of the nozzle throat of the supersonic nozzle.

The high-frequency discharge can be adapted to the high-frequency excitation region in an optimum manner when the high-frequency discharge is performed between two high-frequency electrodes located opposite one another.

In this respect, the high-frequency electrodes are expediently stabilized dielectrically in order to maintain a discharge over a large area.

With respect to the circuit for the laser gas, no detailed comments have been made within the scope of the above description of one embodiment. In an advantageous embodiment, the circuit for the laser gas comprises a heat exchanger for cooling the laser gas.

In addition, the circuit for the laser gas is expediently provided with a circulating pump. In order to achieve an optimum cooling of the laser gas, the heat exchanger is arranged in front of the circulating pump and a heat exchanger is additionally arranged, in particular, after the circulating pump.

In order, in addition, to eliminate $CO_2$ components which would negatively influence the laser activity of the CO laser, a $CO_2$ filter is expediently arranged upstream of the supersonic nozzle and is located, in particular, upstream of the excitation region, as well.

BRIEF DESCRIPTION OF THE DRAWING

Additional features and advantages of the inventive solution are the subject matter of the following description as well as the drawings of one embodiment. In the drawings.

DETAILED DESCRIPTION OF THE INVENTION

Figure 1:
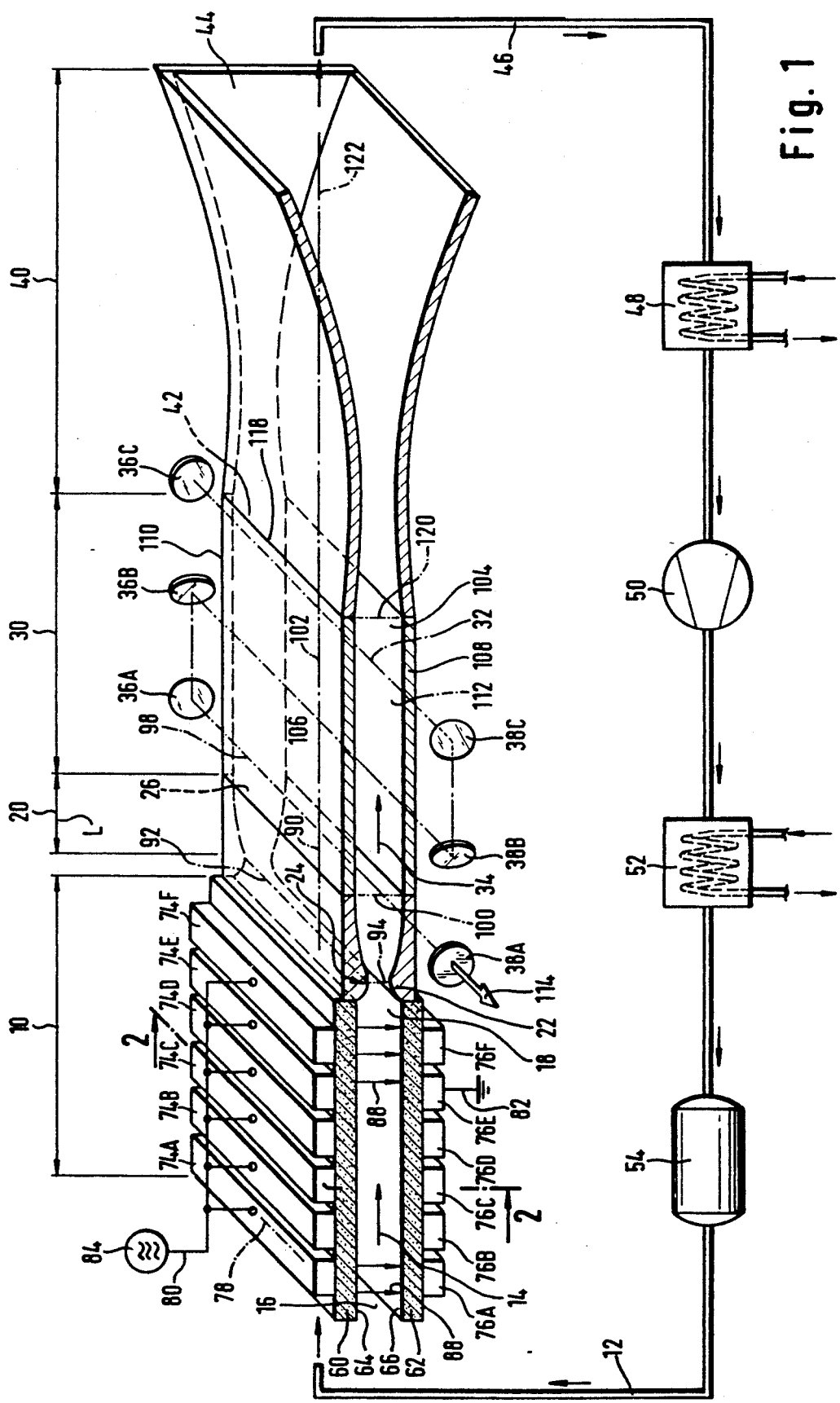
FIG. 1 is a perspective, laterally open illustration of one embodiment

One embodiment of an inventive gasdynamic CO laser comprises an excitation region designated as a whole as 10, to which a laser gas is supplied via a supply line 12, this laser gas flowing through the excitation region in a direction of flow 14 from an inlet side 16 to an outlet side 18. A supersonic nozzle designated as a whole as 20 is connected to the outlet side of the excitation region 10 and its inlet 22 lies immediately adjacent the outlet side 18. Proceeding from the inlet 22 the nozzle tapers to a nozzle throat 24 and, following the nozzle throat 24, widens again as far as an outlet 26. A laser-active region 30 follows the outlet 26 of the supersonic nozzle 20 and this is penetrated by a resonator beam path 32 transverse to the direction of flow 34. This resonator beam path 32 is defined between two rows of mirrors 36A, B, C and mirrors 38A, B, C, these rows being arranged on opposite sides of the laser-active region 30.

This laser-active region 30 is followed by a diffuser designated as a whole as 40. Proceeding from an inlet 42, this diffuser tapers slightly and widens to an outlet 44, whereby the outlet 44 has a substantially larger cross section than the inlet 42.

The laser gas is conducted from this outlet 44 via a return line 46 to a heat exchanger 48, flows therethrough and is again compressed by a pump 50 arranged after the heat exchanger, flows through a heat exchanger 52 arranged after the pump 50 and, following the heat exchanger 52, through a $CO_2$ filter 54, from which the laser gas again flows into the supply line 12.

This forms, altogether, a laser gas circuit through which the laser gas constantly flows.

The excitation region 10 is limited by an upper dielectric cover 60 and a lower dielectric cover 62 which have facing surfaces 64 and 66 extending parallel to and spaced from one another and extend from the inlet side 16 as far as the outlet side 18.

Figure 2:
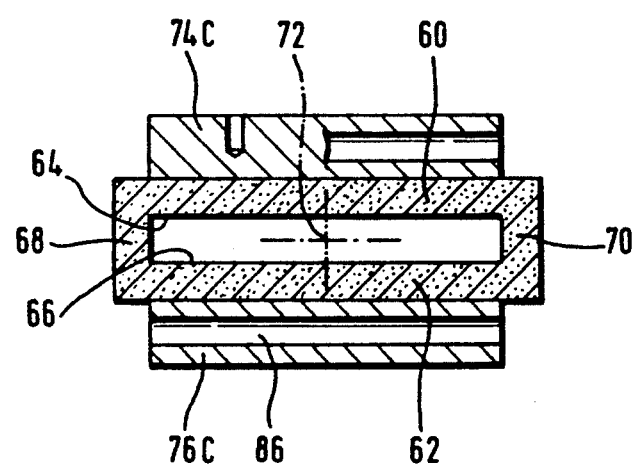
FIG. 2 shows a section along line 2—2 in FIG. 1.

As illustrated in FIG. 2, the excitation region 10 is closed on both sides by side walls 68 and 70 which are integrally formed on the dielectric covers 60 and 62 and form with these a self-supporting tube.

Since the side walls 68 and 70 extend parallel to one another, a flow cross section of the excitation region 10 which is limited by the dielectric covers 60 and 62 as well as the side walls 68 and 70 is constant over the entire extension of the excitation region 10 from the inlet side 16 as far as the outlet side 18.

A central axis 72 of the excitation region 10 extends parallel and centrally to the dielectric covers 60 and 62 as well as to the side walls 68 and 70 and therefore parallel to the direction of flow 14.

Upper electrodes 74A to F and lower electrodes 76A to F are arranged on the sides of the dielectric covers 60 and 62, respectively, facing away from the excitation region 10. These electrodes are of a bar-shaped design and extend with a longitudinal axis 78 essentially at right angles to the central axis 72 and parallel to the surfaces 64 and 66 and preferably over the entire width of the dielectric covers 60 and 62 between the side walls 68 and 70. All the electrodes 74 or 76 seated on one of the dielectric covers 60 and 62, respectively, are connected to a common high-frequency line 80 and 82, respectively. The high-frequency line 80 leads to a high-frequency generator 84 which preferably supplies the electrodes 74 and 76 with a high frequency of 13.6 MHz.

For the purposes of cooling, the electrodes 74 and 76, as illustrated in FIG. 2, are provided with a cooling duct 86 which penetrates the electrodes 74 and 76 again preferably parallel to the longitudinal direction 78.

In the direction of flow 14 the bar-shaped electrodes 74 and 76 are arranged in constant spaced relation, the individual electrodes 74A to F and 76A to F, respectively, being arranged opposite one another so that when the electrodes 74A to F and 76A to F are supplied with high frequency from the high-frequency generator 84 a high-frequency excitation of the laser gas occurs in the excitation region 10 via an electrical field 88. The electrical field 88 hereby defines a high-frequency excitation region which essentially begins immediately following the inlet side 16 and ends in front of the outlet side 18, i.e. it does not extend into the supersonic nozzle 20.

The laser gas is supplied to the excitation region 10 through the supply line 12 such that it is present in this region at a pressure of approximately 500 mbar at temperatures of 295 to 350 Kelvin, provided that the electrodes 74 and 76 are supplied with high frequency from the high-frequency generator. In the excitation region 10, the laser gas is completely excited essentially over the entire flow cross section due to this high frequency. The dielectric covers 60 and 62 bring about a substantially uniform distribution of the electrical field 88 over the entire excitation region 10 and prevent any constriction of the discharge to a punctiform or linear region.

After flowing through the excitation region 10 in the direction of flow 14, the laser gas passes into the supersonic nozzle 20 which also has a central axis 90 coaxially aligned, for its part, with the central axis 72 of the excitation region 10. The supersonic nozzle 20 has, in the region of its upstream inlet 22, a flow cross section which corresponds in size and shape to the flow cross section at the outlet side 18 of the excitation region 10. Proceeding from this inlet 22, the supersonic nozzle tapers, as already described, towards the nozzle throat 24. This throat has a long cross-sectional side 92 and a short cross-sectional side 94 which define the flow cross section in the region of the nozzle throat 24, i.e. in the region of the narrowest point of the supersonic nozzle 20. The long cross-sectional side 92 has the same extension as the excitation region 10 between the side walls 68 and 70 so that no alteration in the dimension occurs in a direction parallel to the long cross-sectional side 92. On the other hand, the dimension of the short cross-sectional side 94 is smaller than the space between the surfaces 64 and 66 of the dielectric covers 60 and 62.

Preferably, the long cross-sectional side 92 and the short cross-sectional side 94 each extend at right angles to the central axis 90 of the supersonic nozzle 20 so that the long cross-sectional side 92 is parallel to the surfaces 64 and 66 of the dielectric covers 60 and 62 whereas the short cross-sectional side 94 extends parallel to a space between the surfaces 64 and 66.

Following the nozzle throat, the supersonic nozzle 20 extends over a length L as far as the outlet 26.

In accordance with the invention, the supersonic nozzle 20 is designed such that, proceeding from the pressure of 500 mbar prevailing at its upstream inlet 22, it generates at its downstream outlet 26 a pressure of, for example, 15 mbar or a laser gas temperature of 90 Kelvin. This means that the nozzle is designed as a so-called "short nozzle", the length of which is approximately 6 times the dimension of the short cross-sectional side 94 of the nozzle throat 24 or the height of the nozzle throat 24. Due to the design of the supersonic nozzle 20 as a short nozzle, boundary layers occur in the supersonic nozzle only to an insignificant degree and so these are of minor importance.

Preferably, a long cross-sectional side 98 at the outlet 26 is exactly the same length as the long cross-sectional side 92 of the nozzle throat 24 and a short cross-sectional side 100 is approximately 3 times as high as the short cross-sectional side 94 in the nozzle throat 24.

The laser-active region 30 follows the outlet 26, as already described, and this has a central axis 102 which is aligned coaxially to the central axis 90.

The laser-active region 30 is formed by a passageway 104 having a rectangular flow cross section and extending coaxially to the central axis 102. A flow cross section of the passageway 104 corresponds to a flow cross section of the outlet 26 of the supersonic nozzle. This flow cross section of the passageway 104 remains substantially constant over the entire extension of the passageway in the direction of flow 34 from the outlet 26 of the supersonic nozzle 20 to the inlet 42 of the diffuser 40. Gasdynamic surges can be avoided particularly well when the flow cross section of the passageway 104 expands slightly towards the diffuser 40.

The laser activity now takes place in this passageway 104, whereby the resonator beam path 32, insofar as it penetrates the passageway 104 with a plurality of branches, extends transversely to the central axis 102 and parallel to the longitudinal cross-sectional side 98 of the outlet and, therefore, parallel to an upper passageway wall 106 and a lower passageway wall 108 and exits from a rear passageway wall 110 and a front passageway wall 112 in order to impinge each time on the mirrors 36 or the mirrors 38.

The mirrors 36 and 38 form a folded resonator. The resonator beam path 32, proceeding from the mirror 36C, extends with a first branch transversely to the central axis 102 to the mirror 38C, from there to the mirror 38B with a second branch, from the mirror 38B transversely to the central axis 102 to the mirror 36B, from the mirror 36B to the mirror 36A and from there with a third branch transversely to the central axis 102 as far as the mirror 38A which is designed as a semipermeable mirror and allows a laser beam 114 to exit.

In the inventive embodiment, the conditions defined by the supersonic nozzle 20 prevail in the laser-active region 30, i.e. a pressure of approximately 15 mbar and a temperature of 90 Kelvin, which are responsible for making a laser activity of the CO molecules in the laser gas possible.

The diffuser 40 follows the laser-active region 30 with the same flow cross section, parallel in the direction of both the long cross-sectional side 98 and of the short cross-sectional side 100, as that at the outlet 26 of the supersonic nozzle 20. Therefore, a long cross-sectional side 118 and a short cross-sectional side 120 of the inlet 42 to the diffuser 40 have identical dimensions to the long cross-sectional side 98 and the short cross-sectional side 100.

Following the inlet 42, the diffuser 40 tapers merely in the direction of the short cross-sectional side 120 but keeps its dimension in the direction of the long cross-sectional side 118. Preferably, the diffuser 40 also has a central axis 122 which is arranged coaxially to the central axis 102.

After flowing through the laser-active region, the laser gas enters the diffuser 40 at a temperature of approximately 90 Kelvin and a pressure of 15 mbar and experiences in the diffuser 40 an increase in pressure to a pressure of approximately 80 mbar and an increase in temperature to a temperature of approximately 395 Kelvin.

From the outlet 44 of the diffuser 40, the laser gas is cyclically returned to the supply line 12 in the laser gas circuit via the return line 46, the heat exchanger 48, the pump 50, the heat exchanger 52 and the $CO_2$ filter and from the supply line is fed again into the excitation region 10.

In this respect, the heat exchanger 48 causes a cooling of the laser gas prior to compression thereof to a pressure of approximately 500 mbar by the pump 50. The heat exchanger 52 again causes a cooling of the laser gas heated by the pump 50 to a temperature of approximately 295 Kelvin, at which the laser gas passes through the $CO_2$ filter 54 and is fed via the supply line 12 to the excitation region 10.

The present disclosure relates to the subject matter disclosed in German application No. P 40 28 054.3 of Sep. 5, 1990, the entire specification of which is incorporated herein by reference.

What is claimed is:

1. A gasdynamic CO laser comprising:
   an excitation region;
   means for exciting a laser gas supplied to said excitation region;
   a supersonic nozzle in series with said excitation region for receiving said laser gas;
   a laser active region in series with said supersonic nozzle and excitation region, said laser active region being penetrated by a resonator beam path; and
   a closed laser gas circuit for cyclically conducting said laser gas through said series coupled excitation region, supersonic nozzle and laser active region;
   wherein said supersonic nozzle has a cross sectional profile along its length for providing said laser gas at a temperature of approximately 80° Kelvin to approximately 180° Kelvin at an outlet thereof.

2. A gasdynamic CO laser in accordance with claim 1 wherein said supersonic nozzle has a nozzle throat with a flow cross section in the shape of an elongated rectangle or slit with a long and a short cross-sectional side.

3. A gasdynamic CO laser in accordance with claim 2 wherein said supersonic nozzle widens downstream of said nozzle throat essentially only in a direction parallel to said short cross-sectional side of said nozzle throat.

4. A gasdynamic CO laser in accordance with claim 3 wherein said supersonic nozzle has a constant dimension in a direction parallel to said long cross-sectional side of said nozzle throat.

5. A gasdynamic CO laser in accordance with claim 2 wherein said supersonic nozzle, measured downstream of said nozzle throat, has a length L approximately four to eight times said dimension of said short cross-sectional side of said nozzle throat.

6. A gasdynamic CO laser in accordance with claim 5 wherein said length L is approximately six times said dimension of said short cross-sectional side of said nozzle throat.

7. A gasdynamic CO laser in accordance with claim 2 wherein said supersonic nozzle has a flow cross-section at said outlet thereof with a short cross-sectional side having a dimension approximately two to four times said dimension of said short cross-sectional side of said nozzle throat.

8. A gasdynamic CO laser in accordance with claim 7 wherein said flow cross-section at said outlet of said supersonic nozzle is approximately three times said dimension of said short cross-sectional side of said nozzle throat.

9. A gasdynamic CO laser in accordance with claim 1 further comprising a diffuser in said laser gas circuit following said laser-active region.

10. A gasdynamic CO laser in accordance with claim 9 wherein said laser gas is provided to an inlet of said diffuser at a first pressure, and said diffuser increases said pressure.

11. A gasdynamic CO laser in accordance with claim 10 wherein said diffuser increases said pressure by a factor of approximately four to seven.

12. A gasdynamic CO laser in accordance with claim 1 wherein said laser active region is arranged downstream of said supersonic nozzle.

13. A gasdynamic CO laser in accordance with claim 12 wherein said laser active region comprises a passageway having an approximately constant flow cross-section.

14. A gasdynamic CO laser in accordance with claim 13 wherein said passageway is penetrated a plurality of times by said resonator beam path in the form of branches located one behind the other in a flow direction of said laser gas.

15. A gasdynamic CO laser in accordance with claim 13 wherein said flow cross-section of said passageway corresponds to a flow cross-section of said supersonic nozzle at said outlet thereof.

16. A gasdynamic CO laser in accordance with claim 1 wherein said excitation region is located upstream of said supersonic nozzle.

17. A gasdynamic CO laser in accordance with claim 16 wherein:
   said means for exciting said laser gas comprise means for providing a high frequency discharge in a high frequency discharge region of said excitation region; and
   said high frequency discharge region ends in front of said supersonic nozzle.

18. A gasdynamic CO laser in accordance with claim 17 wherein:
   said supersonic nozzle has a nozzle throat with a flow cross section in the shape of an elongated rectangle or slit with a long and a short cross-sectional side; and
   said high frequency discharge region extends in a direction parallel to said long cross-sectional side of said nozzle throat with essentially the dimension thereof.

19. A gasdynamic CO laser in accordance with claim 17 wherein said means for providing a high frequency discharge comprise two high frequency electrodes located opposite one another, with said high frequency discharge occurring between said electrodes.

20. A gasdynamic CO laser in accordance with claim 19 wherein said high frequency discharge is dielectrically stabilized.

21. A gasdynamic CO laser in accordance with claim 1 wherein said laser gas circuit comprises a heat exchanger.

22. A gasdynamic CO laser in accordance with claim 1 wherein said laser gas circuit comprises a circulating pump.

23. A gasdynamic CO laser in accordance with claim 1 further comprising a $CO_2$ filter arranged in said laser gas circuit upstream of said supersonic nozzle.

* * * * *